United States Patent
Brunson et al.

(10) Patent No.: US 7,809,125 B2
(45) Date of Patent: Oct. 5, 2010

(54) METHOD AND APPARATUS FOR SELECTION OF SPECIAL-PURPOSE GATEWAYS

(75) Inventors: Gordon Richards Brunson, Broomfield, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1411 days.

(21) Appl. No.: 11/217,531

(22) Filed: Sep. 1, 2005

(65) Prior Publication Data

US 2007/0047709 A1 Mar. 1, 2007

(51) Int. Cl.
*H04M 7/00* (2006.01)
(52) U.S. Cl. .................. 379/221.01; 370/353; 370/354; 370/355; 370/356
(58) Field of Classification Search .................. 370/410, 370/401, 235, 352–356; 375/222; 379/52, 379/93.01, 93.08, 221.02, 221.01
See application file for complete search history.

(56) References Cited

U.S. PATENT DOCUMENTS

| | | | |
|---|---|---|---|
| 6,493,558 B1 | 12/2002 | Bernhart et al. | |
| 6,914,964 B1 * | 7/2005 | Levine | 379/52 |
| 7,212,622 B2 * | 5/2007 | Delaney et al. | 379/221.02 |
| 7,248,565 B1 * | 7/2007 | Fourie | 370/235 |
| 2004/0052243 A1 * | 3/2004 | Bostrom et al. | 370/352 |

FOREIGN PATENT DOCUMENTS

| | | |
|---|---|---|
| WO | WO0119096 A1 | 3/2001 |
| WO | WO03032601 A1 | 4/2003 |

OTHER PUBLICATIONS

European Search Report, date Nov. 3, 2009.
Wilson Christopher Lamb: "DTMF to TTY gateway", Research Disclosure, Mason Publications, Hampshire, GB, vol. 462, No. 46, Oct. 1, 2002, ISSN: 0374-4353.

* cited by examiner

*Primary Examiner*—Md S Elahee
(74) *Attorney, Agent, or Firm*—John C. Moran

(57) ABSTRACT

A method and apparatus route telecommunication calls in a communication system based on media type by detecting a requirement for a special media type for a telecommunication call; and selecting a subset of a plurality of gateways wherein only the subset of gateways is capable of providing communication for the special media type.

34 Claims, 15 Drawing Sheets

METHOD AND APPARATUS FOR SELECTION OF SPECIAL-PURPOSE GATEWAYS

TECHNICAL FIELD

This invention relates to the routing of communication information.

BACKGROUND

TTY devices—also known as TDDs or Text Telephones—are text terminals commonly employed by people who are deaf or hard-of-hearing in order to communicate over telephone systems. A problem within the field is that, often depending on the country of origin, there are presently at least nine different incompatible TTY transmission formats. These include:
- (1) 45.45 baud Baudot tones (common in the US)
- (2) The Bell 103 modem standard (common in the US)
- (3) The Bell 202 modem standard (common in the US)
- (4) Turbocode (a proprietary TTY protocol developed by Ultratec Corporation)
- (5) European Deaf Telephone, or EDT (common in, e.g., Germany, Austria, Italy, and Spain)
- (6) Minitel (common, e.g., in France)
- (7) ITU V.21 modem (common, e.g., in Sweden, Finland, Norway, and the UK)
- (8) 50 baud Baudot tones (common, e.g., in Ireland and Australia)
- (9) Dual tone multi-frequency signals, or DTMF (common, e.g., in Holland and Denmark)

In all cases, the audio-encoded signals generated by these TTY devices are transported reliably by the traditional analog Circuit Switched Telephone Networks (CSTN's) such as the Switched Telephone Network (CSTN), or networks of circuit-switched Private Branch Exchanges (PBX's), or combination thereof. Unfortunately, the same does not hold true for Voice over Internet Protocol (VoIP) telephony systems. When TTY signals are transported on VoIP networks, using the same mechanisms that are used for voice transmissions, common sources of VoIP audio distortion that tend to be tolerated by the human ear—notably audio compression and packet loss—can have a devastating impact on TTY transmission accuracy. For this reason, it is generally accepted that the gateways through which VoIP networks interface with the CSTN must be able to translate between analog TTY signals on the CSTN and non-audio data packets suitable for reliable transmission within VoIP networks.

Although many transmission formats have been proposed for TTY-on-IP, international standards organizations appear to be leaning toward adopting ITU Recommendation T.140 ("Text Conversion Protocol for Multi-Media Application"), with RFC-4103 as the payload type. Within this proposed scenario, VoIP endpoints that are capable of TTY-style interaction would be required to support the T.140/RFC-4103 standard. It is important to note that these VoIP endpoints would not be expected to recognize or transmit traditional CSTN TTY signals. When the user of a T.140/RFC-4103 VoIP device is interacting with the user of a traditional TTY device on the CSTN, the expectation is that the VoIP/CSTN gateway will translate between the two devices.

Looking now at telecommunications laws and regulations that apply to TTY usage, such as the Americans with Disabilities Act of 1990, Section 255 of the Telecommunications Act of 1996, and Section 508 of the Rehabilitation Act Amendments of 1998, it is clearly desirable (if not a requirement) that TTY users be permitted to interact with each other directly, without regard for whether they are on the CSTN or are using VoIP. Although the problem is solvable by enabling all ports on VoIP/CSTN gateways to translate between T.140/RFC-4103 packets and traditional analog TTY signals, such an approach is economically impractical. Keeping in mind that TTY conversations constitute a relatively small percentage of all telephone calls, it is hard to justify the added complexity and cost of requiring all VoIP/CSTN gateway ports to "listen for" and be able to translate all nine of the above CSTN TTY protocols.

SUMMARY OF THE INVENTION

A method and apparatus route telecommunication calls in a communication system based on media type by detecting a requirement for a special media type for a telecommunication call; and selecting a subset of a plurality of gateways wherein only the subset of gateways is capable of providing communication for the special media type.

DETAILED DESCRIPTION

Figure 1:
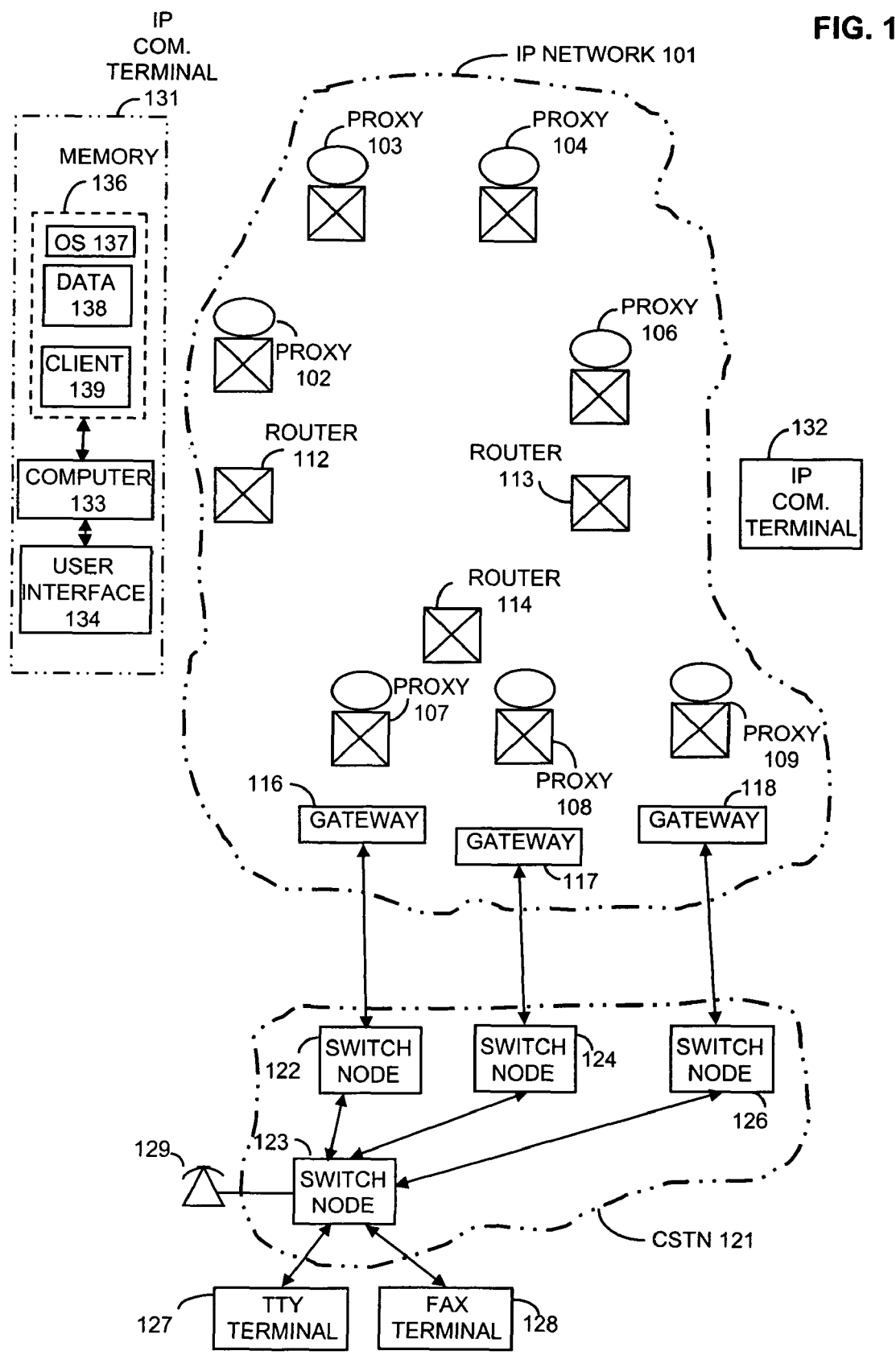
FIG. 1 illustrates one embodiment of a system that allows the interconnection of IP communication terminals and specialized terminals and telephones that are interconnected to an IP network and a circuit switched telephone network.

FIG. 1 illustrates IP network 101 interconnected to a circuit switched telephone network (CSTN) 121 via gateways 116-118. Circuit switched telephone network 121 is providing service for devices 127-129. IP network 101 is providing service for terminals 131-132. One skilled in the art could readily see that there could be a multitude of devices being interconnected by IP network 101. Such devices may be, but are not limited to, computers, voice messaging systems, and instant messaging systems. Similarly, circuit switched telephone network 121 could also be interconnecting a variety of telephone types and terminal types and systems and switch nodes 122-126 may be PBX's or central office switches.

IP network 101 utilizes the session initiation protocol (SIP). SIP is defined in the Internet Engineering Task Force (IETF) Request for Comments (RFC) 3261 "SIP: Session Initiation Protocol", June, 2002. SIP solves the general problem of finding "dialed" endpoints and exchanging critical parameters which endpoints must agree on in order to establish media sessions (calls) across IP network 101. The SIP protocol supports the establishment of voice-only sessions or multimedia sessions. SIP endpoints (such as IP communication terminals 131 and 132) control the supported media types by accepting or rejecting offered media streams. Once the session parameters are exchanged, the endpoint devices send session data directly to each other without using SIP utilizing the RTP protocol to route directly through routers such as routers 112-114.

SIP has a generalized address structure that supports "dialing" by URL (like an email address) or "dialing" by a number (like a PBX or Public Switched Telephone Network number). This generalized SIP addressing structure is a powerful aspect of SIP service as it effectively bridges circuit-switched and IP domains into a converged addressing domain.

SIP proxies (such as proxies 102-109) operating in autonomous network domains interpret the "dialed" addresses and route session requests to other proxies or endpoints registered within the domain.

Gateways 116 and 118 are capable of communicating audio and video between IP network 101 and circuit switched telephone network 121 but can not reliably communicate special protocols such as those utilized by TTY terminal 127 and fax terminal 128. Gateway 117 can translate between protocols to allow the correct operation of TTY terminal 127 and fax terminal 128 when they are interconnected to an IP communication terminal. If IP communication terminal 131 wishes to establish communication with TTY terminal 127 and 128, the problem is to identify that the information is to be routed via gateway 117 rather than gateways 116 and 118.

Figure 12:
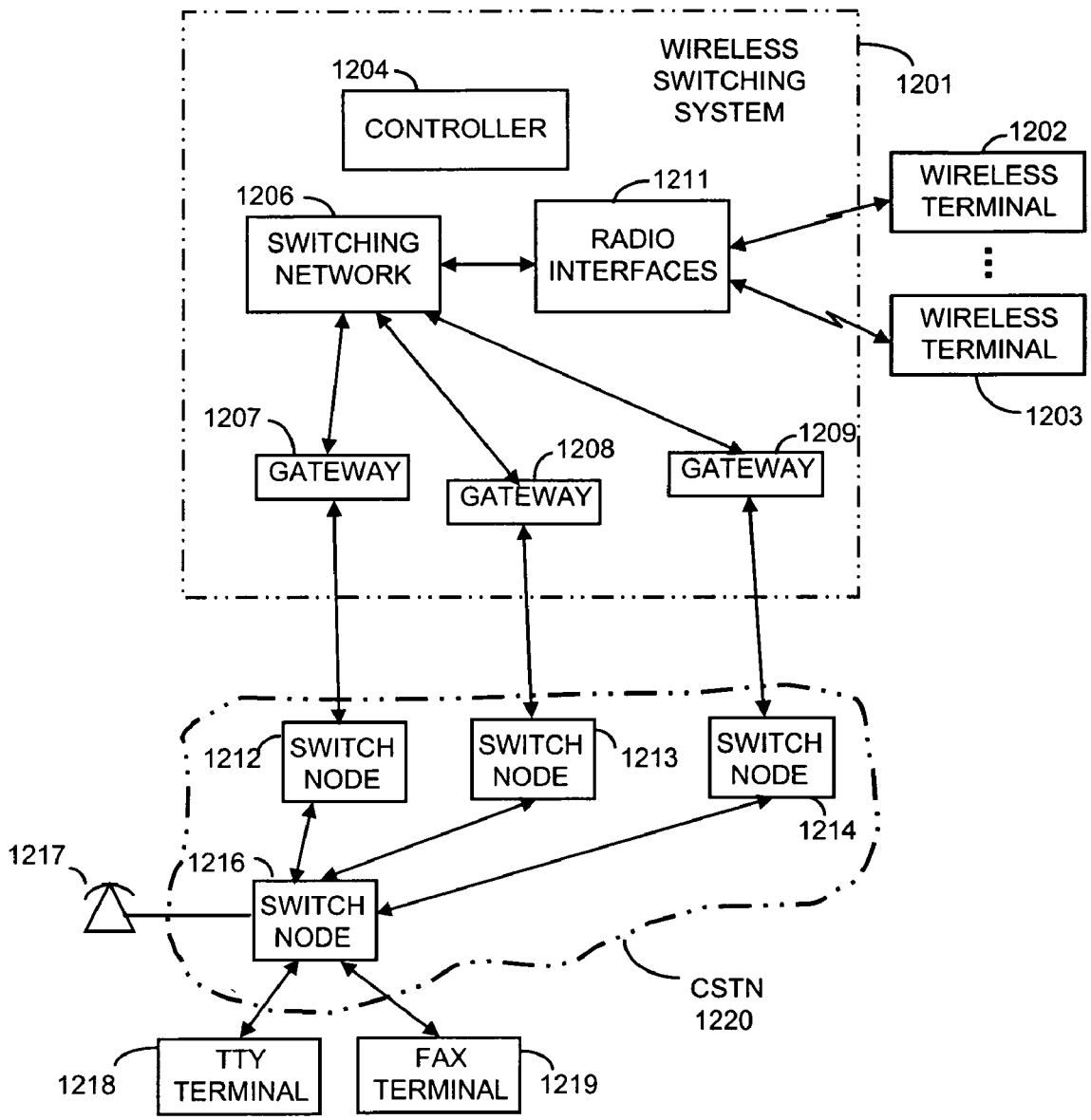
FIG. 12 illustrates one embodiment of a system that allows the interconnection of wireless communication terminals and specialized terminals and telephones that are interconnected to an wireless switching system and a circuit switched telephone network.
Figure 13:
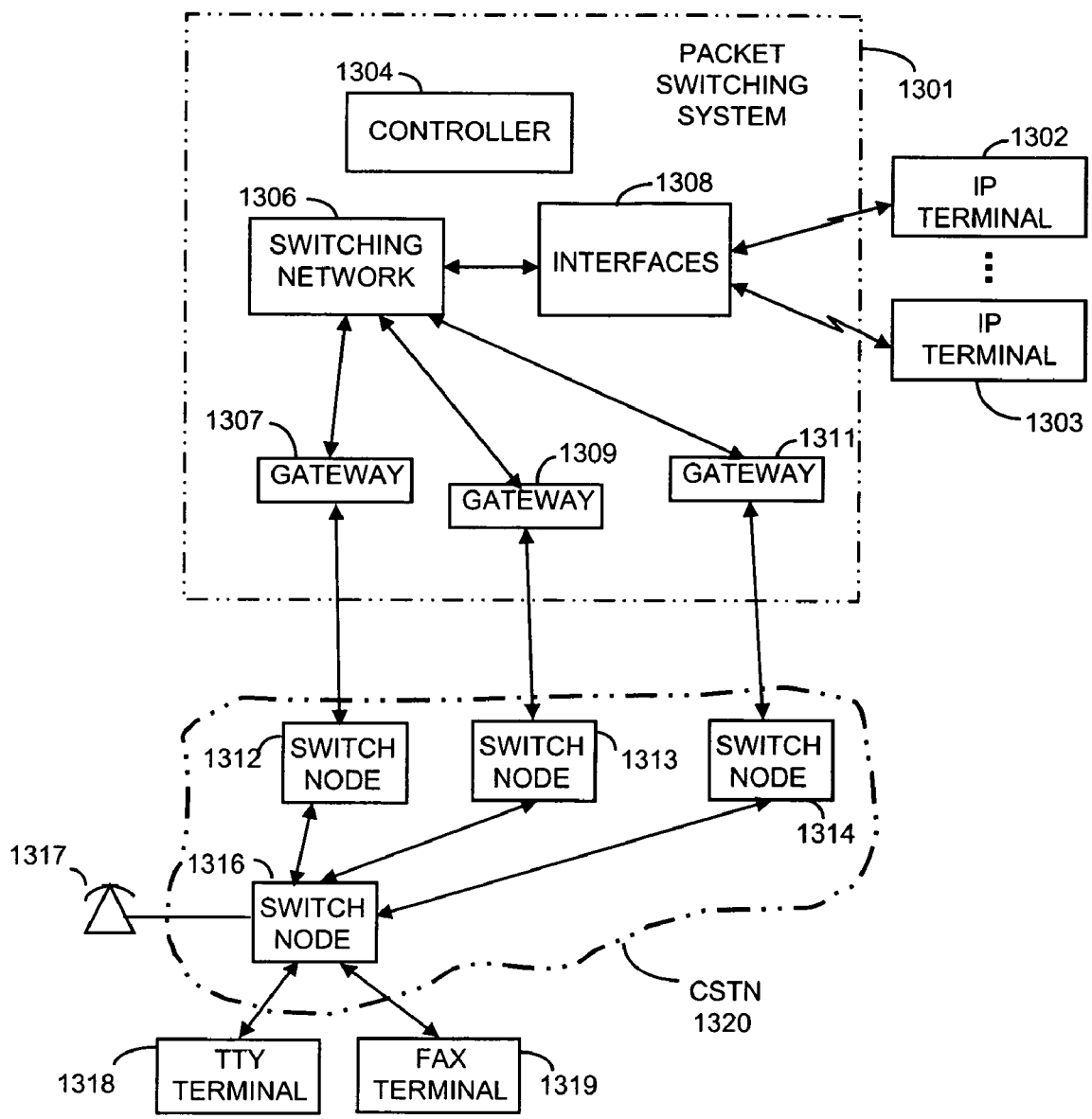
FIG. 13 illustrates one embodiment of a system that allows the interconnection of IP communication terminals and specialized terminals and telephones that are interconnected to another IP network and a circuit switched telephone network.

In a first embodiment the client, such as client 139 of IP communication terminal 131, inserts into the message utilized to establish the communication path a feature access code that defines that the communication will require a special protocol such as used by TTY terminal 127 or fax terminal 128. This initial message (referred to as an invite message in SIP) is then routed through the various proxies until a proxy is found that can interpret the access code. In the present example, such a proxy would be proxy 108. Proxy 108 recognizes the access code and places a call using the telephone number included in the invite message to the appropriate terminal via the circuit switched telephone network 121. FIGS. 12 and 13 illustrate the use of the first embodiment in other types of switching networks.

In second embodiment, the client recognizes the need to establish a call with the special protocol and inserts into the SIP invite message a proprietary header which defines the media requirements that will be necessary for the communication that is being established. The client also includes the telephone number of the terminal that is to be called on the circuit switched telephone network 121. The invite message with the proprietary header is then routed through the proxies until it arrives at proxy 108 which recognizes that it can process this proprietary header and establishes communication with the terminal via gateway 117 and the circuit switched telephone network 121. The other proxies simply ignore the invite message since they are incapable of handling the proprietary header.

In a third embodiment, the client, upon determining that there is a need for the special media such as that used by TTY terminal 127 or fax terminal 128, specifies this special media in the invite message and then utilizes the SIP protocol to have this invite message routed to the appropriate proxy. As each proxy receives the invite message, the proxy examines the media requirements. If the proxy is connected to a gateway which can handle these media requirements, the proxy then establishes a media session and eventually the communication of the media information is established via the routers using the RTP protocol. In the third embodiment, it is the responsibility of the proxy to determine that it can fulfill the need for the special media.

In addition, the third embodiment allows a call to be initially set up not requiring a special media and then converted to a call utilizing the special media during the course of the call. For example, IP communication terminal 131 can establish a voice call to TTY terminal 127. Upon the user of communication terminal 131 recognizing that they have contacted a TTY terminal, the user can then invoke a text messaging screen which will cause client 139 to transmit a re-invite message containing a request for special media towards the TTY terminal 127. The proxy controlling the gateway will recognize this re-invite message and transfer the call to a gateway that can supply the special media requirements.

Figure 2:
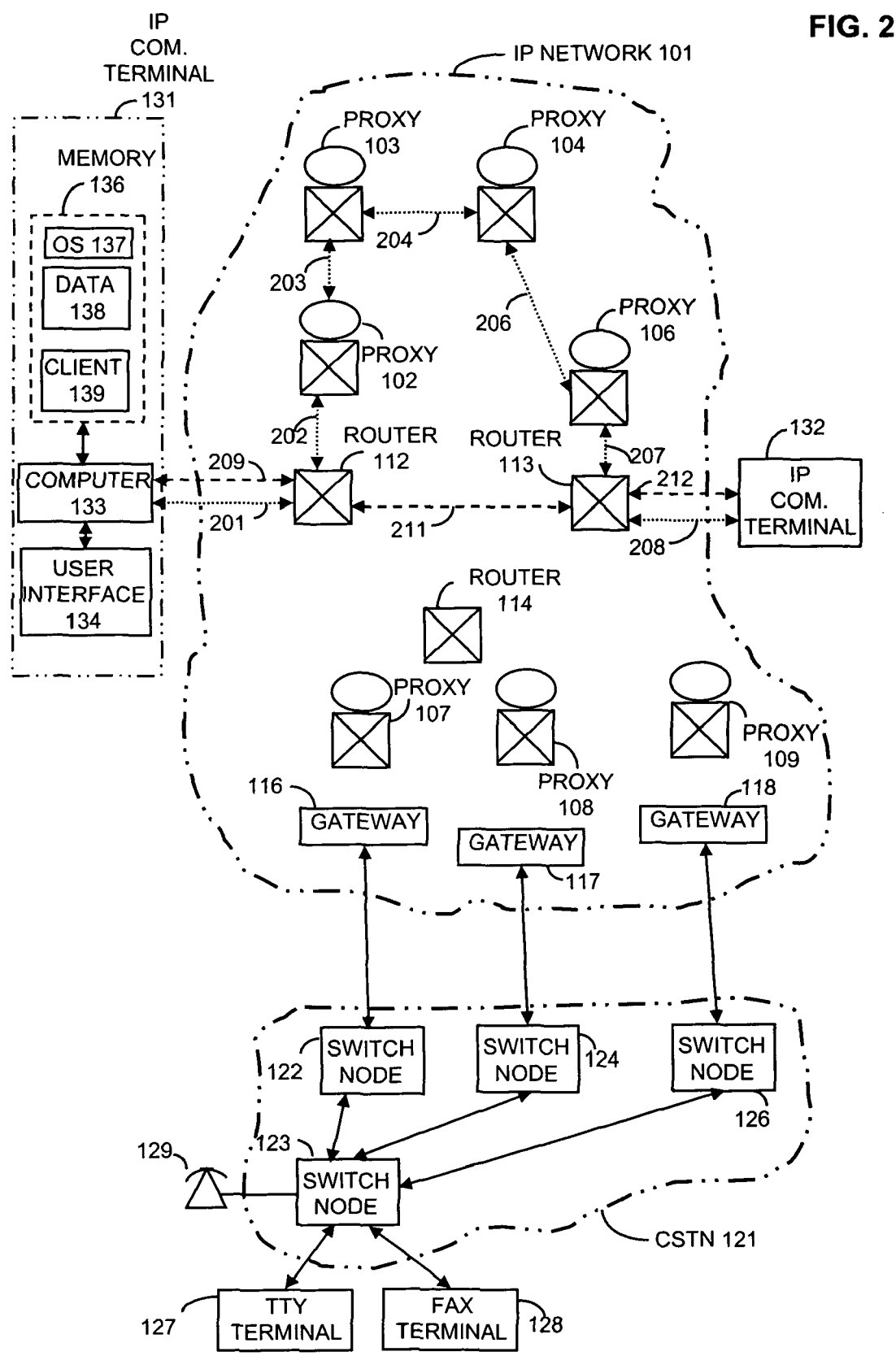
FIG. 2 illustrates an example of establishing a standard call between IP communication terminals.

To understand the operation of the SIP routing consider the following example of a call being set up between IP communication terminal 131 and IP communication terminal 132 as illustrated in FIG. 2. Client 139 in IP communication terminal 131 is responsive to user input via user interface 134 to initiate a call utilizing a URL type address to terminal 132. Terminal 131 is registered on router 112. Initially, when terminal 131 starts the SIP session via link 201, router 112 relays the invite message that is being transmitted intended for terminal 132 to proxy 102 via session link 202. Proxy 102 is authoritative over terminal 131. Proxy 102 can not resolve the address for terminal 132 and relays the invite message to proxy 103 via session link 203. Proxy 103 also can not handle the address so relays the invite message to proxy 104 via session link 204. Proxy 104 recognizes that proxy 106 can resolve the address and relays the invite message to proxy 106 via session link 206. Proxy 106 then relays the invite message to terminal 132 via session link 207, router 113, and session link 208. If terminal 132 is idle, it transmits back via proxies 102-106 and session links 201-208 a 180 ringing message. Then terminal 132 examines the invite message to determine if it can provide the media that is being requested by terminal 131 as determined by the session description protocol (SDP) payload in the invite message. If terminal 132 can indeed provide the requested media, it transmits back a 200 Okay message to terminal 131. Terminal 131 acknowledges the receipt of the 200 Okay message by an ACK message. Terminal 131 received the 200 Okay message transmitted by terminal 132 to terminal 131 which includes the IP address, port number, and CODEC to be used for sending media to terminal 132 by terminal 131. Terminal 131 utilizes the IP address to establish a RTCP stream via RTCP link 209, router 112, RTCP 211, router 113, and RTCP link 212. It is over these established RTCP links that the actual call will take place. The proxies are only involved in the setting up of the call and in signaling information.

Figure 3:
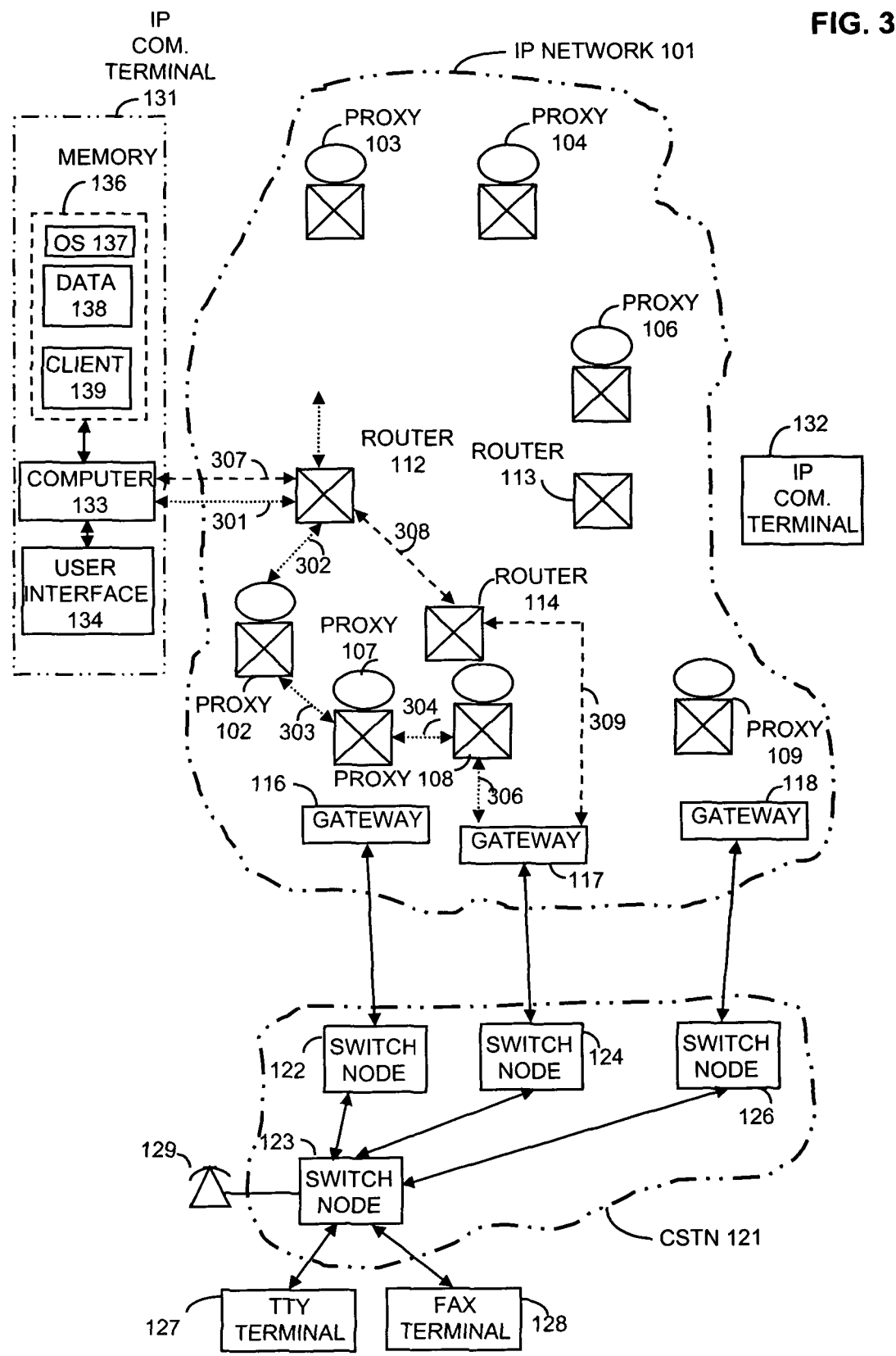
FIG. 3 illustrates an example of establishing a call between an IP communication terminal and a specialized terminal that are interconnected via an IP network and a circuit switched telephone network.

Consider now an example of how the first embodiment would be utilized to establish a media path through the proper gateway so as to reliably communicate with TTY terminal 127 connected to circuit switched telephone network 121 as depicted in FIG. 3. Client 139 of terminal 131 detects the need to establish a special media path upon the user opening a T.140 conversational chat window prior to inputting the telephone number of TTY terminal 127. The client 139 could also recognize the need for a special media path if the user opened a fax folder prior to inputting the telephone number for fax terminal 128. Client 139 transmits an invite message to router 121 via session path 301 with the feature access code for accessing a TTY terminal appended to the telephone number of TTY terminal 127.

Router 112 conveys this information to proxy 102 via session path 302. Proxy 102 relays the invite message via session path 303 to proxy 107 which in turn relays the invite message via session path 304 to proxy 108. Proxy 108 recognizes that gateway 117 has the capabilities for performing the request of the feature access code and relays the invite message to gateway 117 via session path 306. Gateway 117 then establishes a telephone call to TTY terminal 127 via circuit switched telephone network 121. When TTY terminal 127 responds by answering the call, gateway 117 then transmits back the 200 Okay message to computer 133 via the previous noted session paths. Client 139 being executed by computer 33 establishes a RTCP stream via RTCP link 307, router 112, RTCP link 308, router 114, and RTCP link 309. It is the responsibility of gateway 117 to determine which of the plurality of TTY protocols is being used by TTY terminal 127 and to translate between the determined TTY protocol and the protocol used for T.140 conversational chat windows.

Consider the previous example being implemented utilizing the second embodiment. In the second embodiment, client 139 upon recognizing that a T.140 conversational chat window was up and the request was to place a call to the telephone number on the circuit switched telephone network 121, would insert into the invite message a proprietary header specifying that the gateway selected must be capable of supporting the TTY protocol. As before, the session paths would be set up from terminal 131 and eventually would arrive at proxy 108 which would recognize that gateway 117 had the capability of providing the TTY protocol. Proxy 108 would then establish the session path to gateway 117 via session path 306. The establishment of the call then would take place as was performed for the first embodiment. It is the responsibility of gateway 117 to determine which of the plurality of TTY protocols is being used by TTY terminal 127 and to translate between the determined TTY protocol and the protocol used for T.140 conversational chat windows.

Consider now the present example being implemented by the third embodiment. When client 139 recognizes that a T.140 conversational chat window is to be connected to a telephone number on the circuit switched telephone network 121, it inserts into the invite message the special media requirement for communication with a TTY terminal. The invite message eventually reaches proxy 108 which determines that gateway 117 has the capability of supplying the media requirements of a TTY terminal. It is the responsibility of gateway 117 to determine which of the plurality of TTY protocols is being used by TTY terminal 127 and to translate between the determined TTY protocol and the protocol used for T.140 conversational chat windows.

Figure 4:
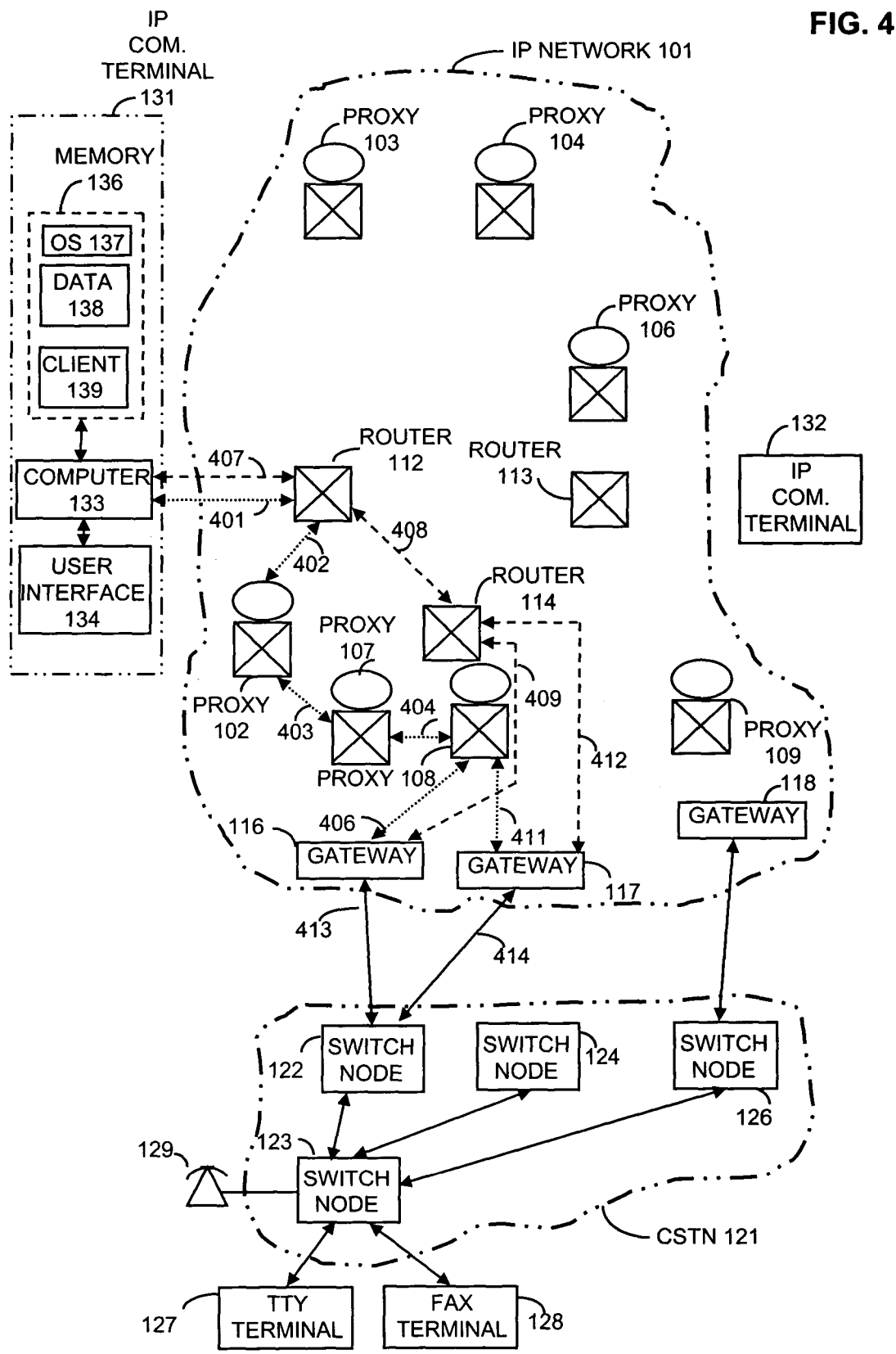
FIG. 4 illustrates an example of establishing and readjusting a call between an IP communication terminal and a specialized terminal that are interconnected via an IP network and a circuit switched telephone network.

Consider now, using FIG. 4, an example of how the third embodiment would be utilized to first establish a media path that had no special media requirements to an endpoint on the circuit switched telephone network 121 by terminal 131 with the endpoint turning out to be TTY terminal 127. Upon answering the incoming call, TTY terminal 127 transmits an audio message stating that it is a TTY terminal. The user of terminal 131 in response to the audio message received from TTY terminal 127 then brings up a T.140 conversational chat window. The proxy controlling the gateways realizes that the media type is being changed and utilizes a different gateway.

Initially, the user of terminal 131 places an audio call to TTY terminal 127 not realizing that it is a TTY terminal. As before, an invite message with the media being specified as audio is transmitted over session path 401, router 112, session path 402, proxy 102, session path 403, proxy 107, session path 404, proxy 409 which realizes that it can relay the call via gateway 116 to circuit switched telephone network 121. Proxy 108 then transmits the invite message via session path 406 to gateway 116. Gateway 116 then negotiates with switch node 122 to establish an audio call to TTY terminal 127. After negotiations are finished with circuit switched telephone network 121, gateway 116 transmits back the necessary session messages to establish the call via the session paths and proxies to computer 133. Computer 133 then establishes a RTCP stream via RTCP link 407, router 112, RTCP link 408, router 114, RTCP link 409 to gateway 116. It is over this RTCP stream that TTY terminal 127 then transmits its audio message indicating that it is a TTY terminal.

The user of terminal 131 is responsive to the audio message from TTY terminal 127 to initiate a T.140 conversational chat window. Client 139 is responsive to the initiation of the chat window to transmit a re-invite message over the session stream to gateway 116. The re-invite message specifies that the special media is required. Proxy 108 is responsive to the re-invite message to determine that gateway 116 can not handle the special media and to determine that gateway 117 can communicate the special media.

Proxy 108 then requests that switch node 122 establish a 3-way call in the circuit switched telephone network between TTY terminal 127, gateway 116, and gateway 117. Proxy 108 then parallels the RTCP stream that is being carried by RTCP link 409 with RTCP link 412, so that gateway 117 and gateway 116 are communicating the same data from computer 133. After this is accomplished, proxy 108 instructs switch node 122 to terminate the call path from gateway 116. At this point the special media protocol can be communicated.

Figure 5:
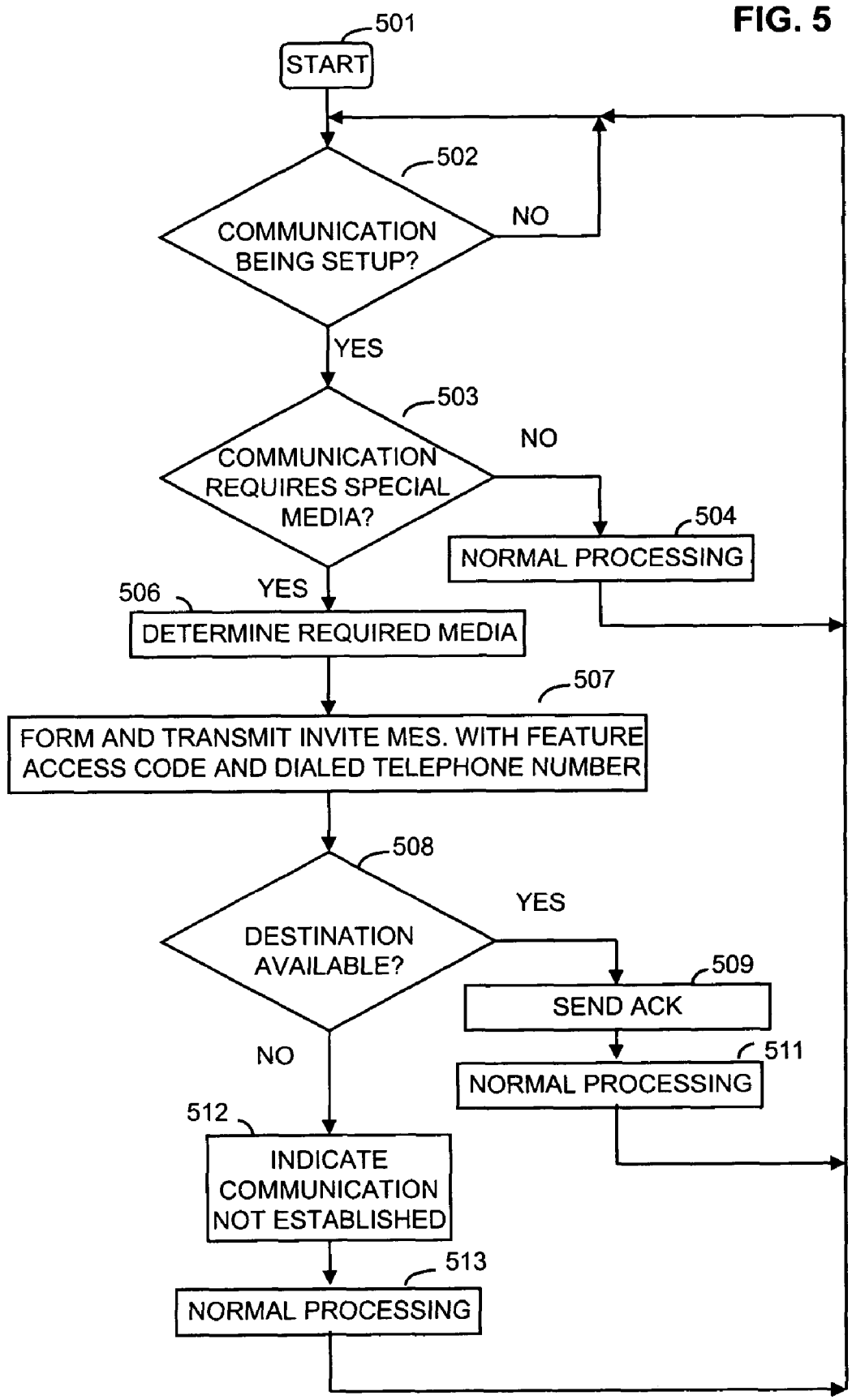
FIG. 5 illustrates, in flowchart form, operations performed by a first embodiment in an IP communication terminal.

FIG. 5 illustrates, in flowchart form, operations performed by a client, such as client 139, in implementing the first embodiment. After being started in block 501, decision block 502 determines if communication is being set up. If the answer is no, control is returned back to decision block 502. If the answer is yes, decision block 503 determines if the communication requires special media. This determination would be performed by detecting that the user had activated a special purpose window such as a T.140 conversation chat window or a fax folder. If the answer is no in decision block 503, block 504 performs normal processing before returning control back to decision block 502.

If the answer is yes in decision block 503, block 506 determines the requirements for the special media. Block 507 forms an invite message with a feature access code defining the special media and the dialed telephone number that defines the destination. Block 507 then transmits the invite message.

After execution of block 507, decision block 508 determines if the destination, as defined by the dialed telephone number, is available. This is accomplished by the normal SIP messages being received back from the endpoint. If the answer is yes, block 509 transmits an acknowledge message to the endpoint, and block 511 performs normal processing before returning control back to decision block 502. If the answer is no in decision block 508, block 512 indicates to the user that the communication could not be established, and block 513 performs normal processing before returning control back to decision block 502.

Figure 6:
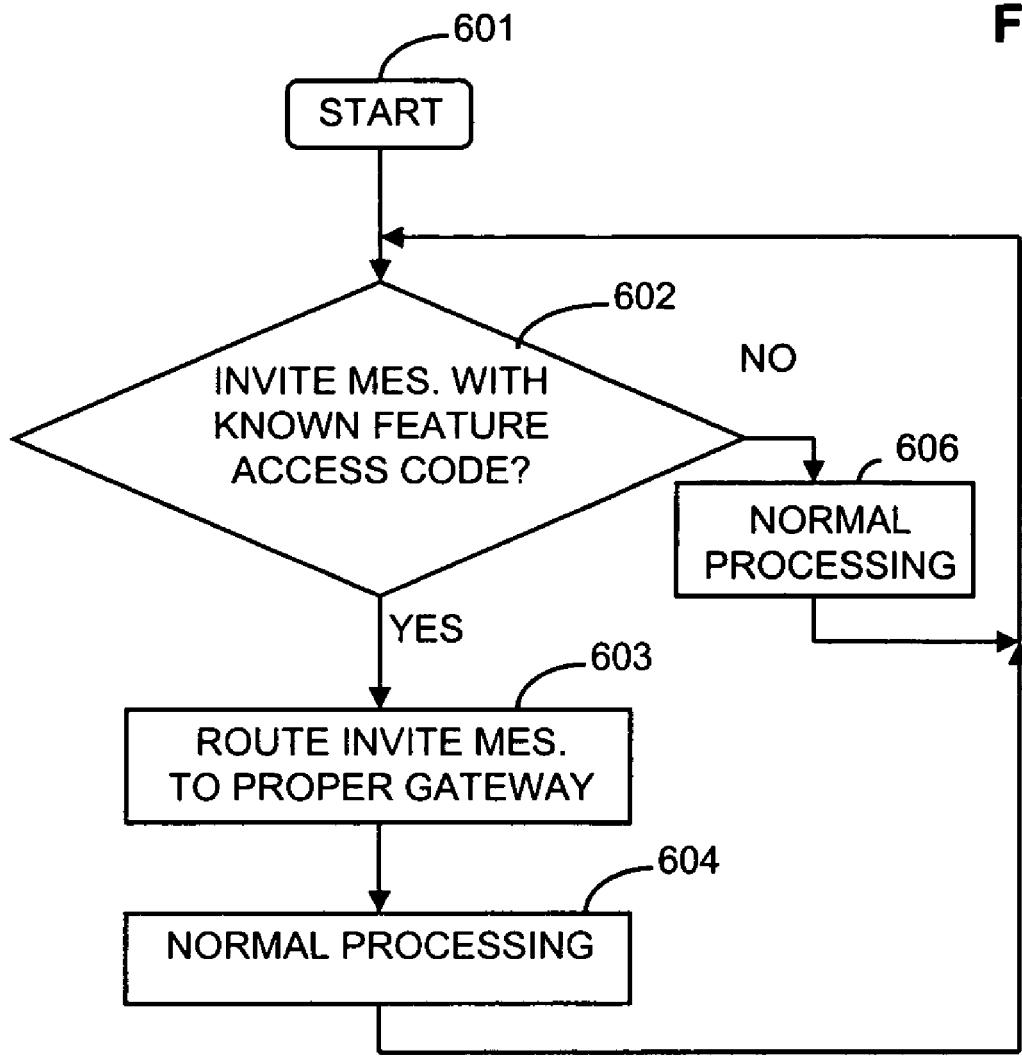
FIG. 6 illustrates, in flowchart form, operations performed by a first embodiment in a proxy.

FIG. 6 illustrates, in flowchart form, operations performed by a proxy such as proxy 108, in implementing the first embodiment. After being started in block 601, decision block 602 determines if an invite message with a feature code known to the proxy has been received. If the answer is no, block 606 performs normal processing before returning control back to decision block 602. If the answer is yes, block 603 routes the invite message to the proper gateway that can supply the special media needed, and block 604 performs normal processing before returning control to decision block 602.

Figure 7:
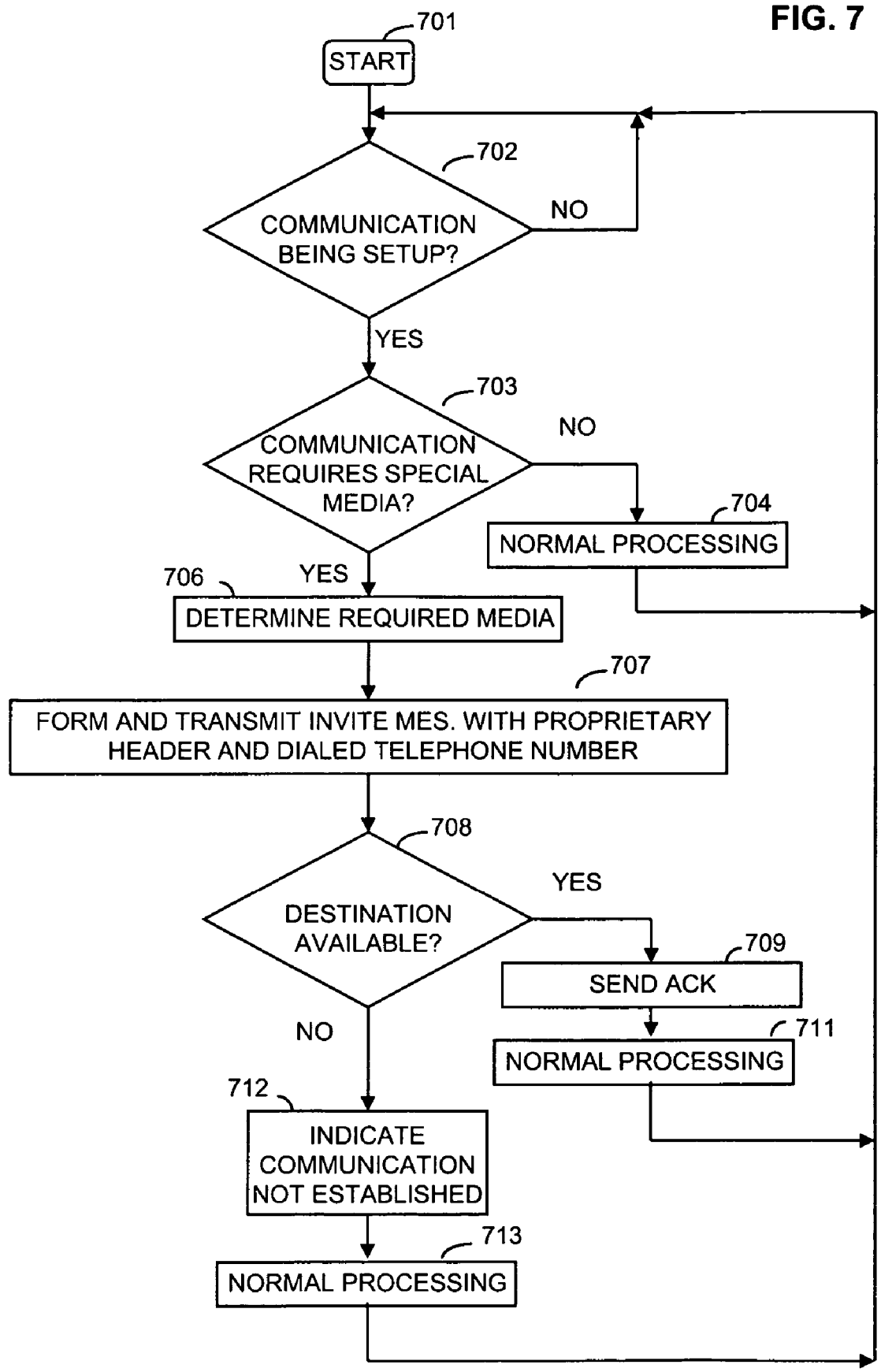
FIG. 7 illustrates, in flowchart form, operations performed by a second embodiment in an IP communication terminal.

FIG. 7 illustrates, in flowchart form, operations performed by a client, such as client 139, in implementing the first embodiment. After being started in block 701, decision block 702 determines if communication is being set up. If the answer is no, control is returned back to decision block 702. If the answer is yes, decision block 703 determines if the communication requires special media. This determination would be performed by detecting that the user had activated a special purpose window such as a T.140 conversation chat window or a fax folder. If the answer is no in decision block 703, block 704 performs normal processing before returning control back to decision block 702.

If the answer is yes in decision block 703, block 706 determines the requirements for the special media. Block 707 forms an invite message with a proprietary header defining the special media and the dialed telephone number that defines the destination. Block 707 then transmits the invite message.

After execution of block 707, decision block 708 determines if the destination, as defined by the dialed telephone number, is available. This is accomplished by the normal SIP messages being received back from the endpoint. If the answer is yes, block 709 transmits an acknowledge message to the endpoint, and block 711 performs normal processing before returning control back to decision block 702. If the answer is no in decision block 708, block 712 indicates to the user that the communication could not be established, and block 713 performs normal processing before returning control back to decision block 702.

Figure 8:
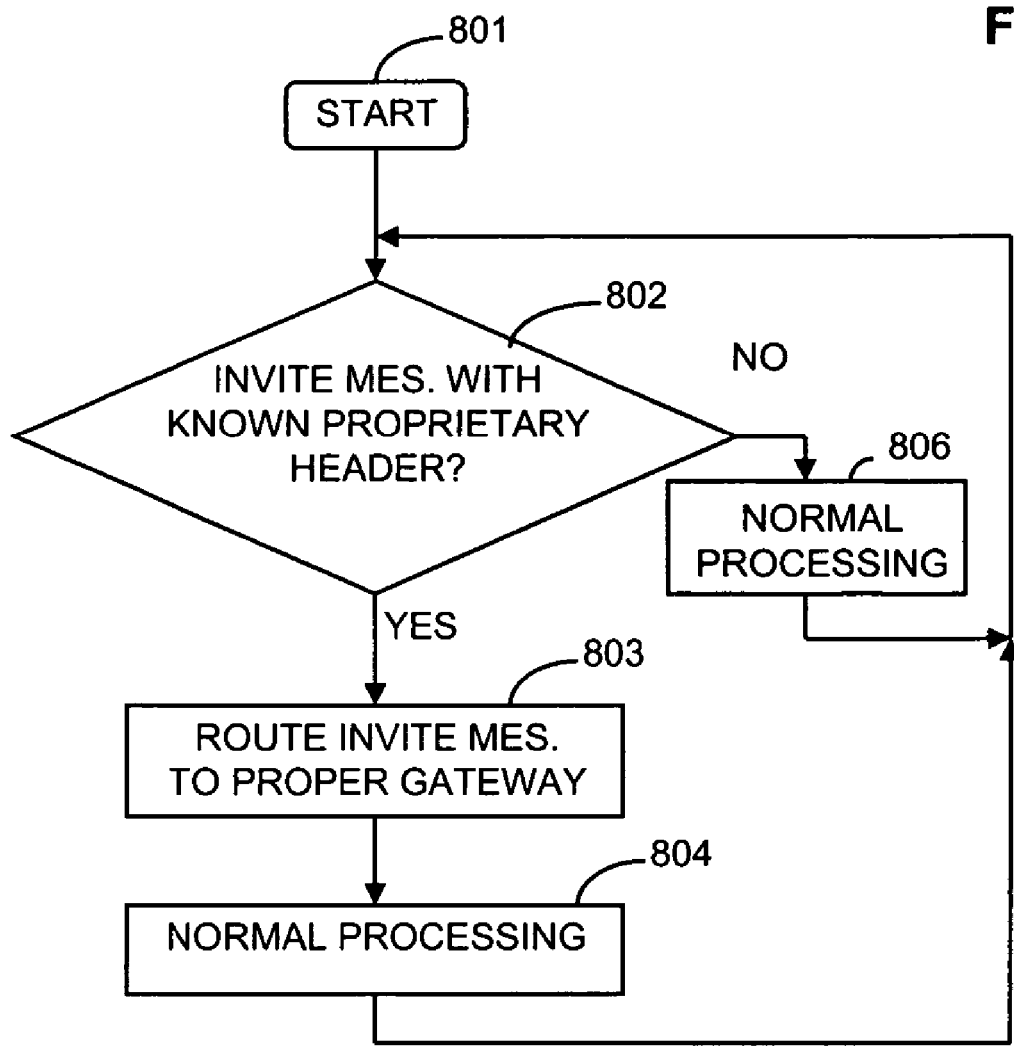
FIG. 8 illustrates, in flowchart form, operations performed by a second embodiment in a proxy.

FIG. 8 illustrates, in flowchart form, operations performed by a proxy such as proxy 108, in implementing the first embodiment. After being started in block 801, decision block 802 determines if an invite message with a proprietary header known to the proxy has been received. If the answer is no, block 806 performs normal processing before returning control back to decision block 802. If the answer is yes, block 803 routes the invite message to the proper gateway that can supply the special media needed, and block 804 performs normal processing before returning control to decision block 802.

Figure 9:
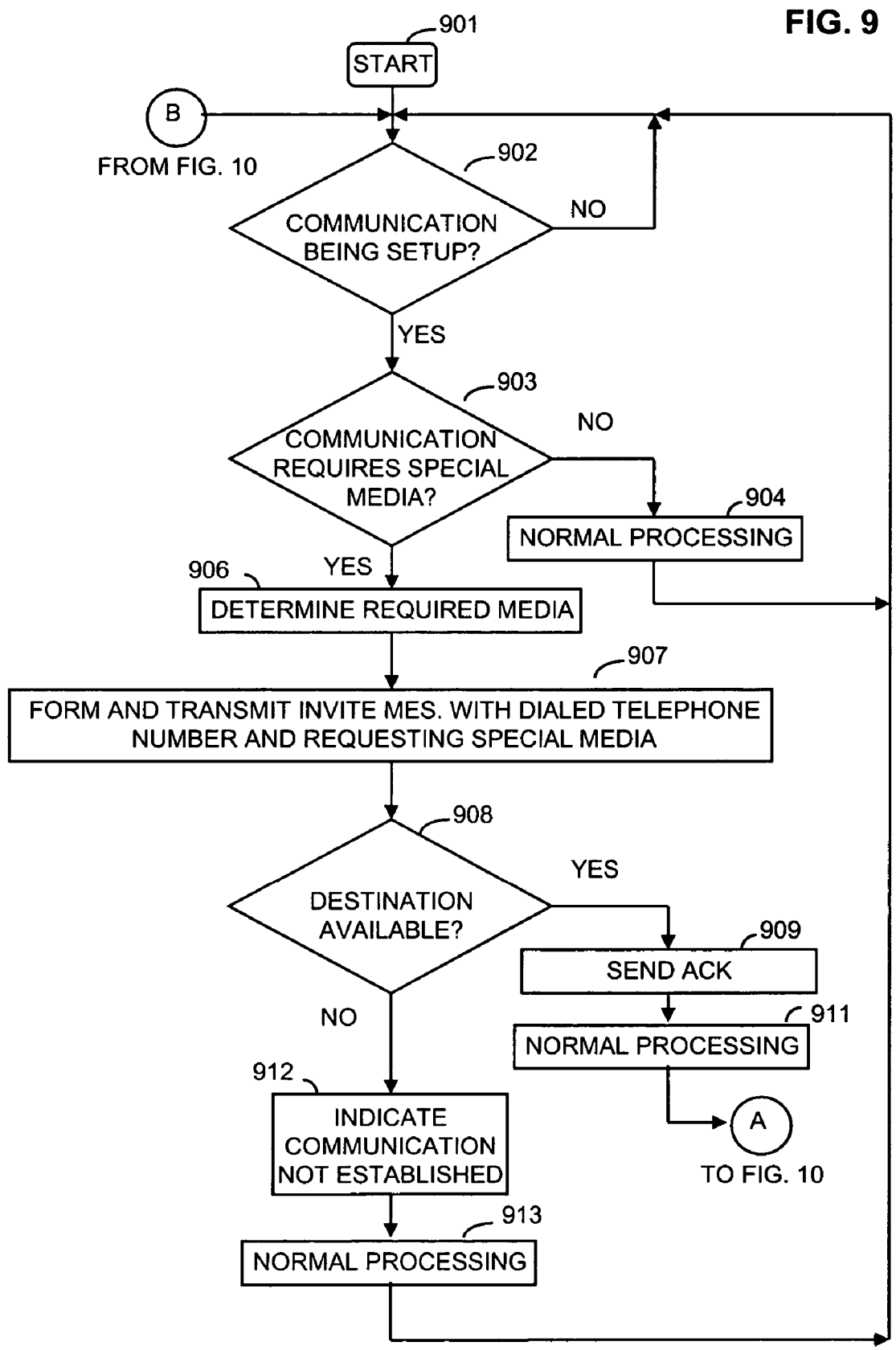
FIGS. 9 and 10 illustrate, in flowchart form, operations performed in a third embodiment in an IP communication terminal.
Figure 10:
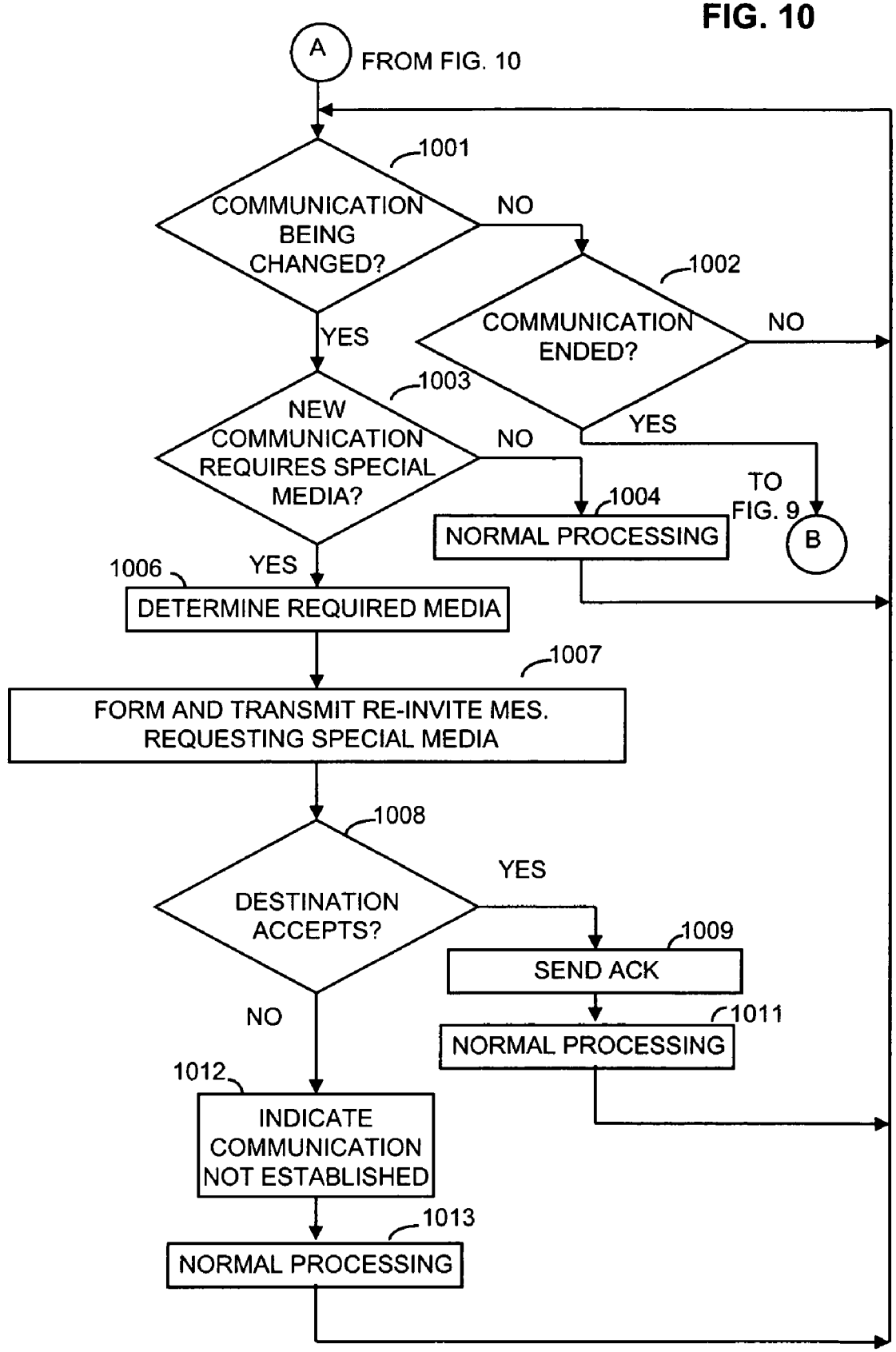

FIGS. 9 and 10 illustrate, in flowchart form, operations performed by a client, such as client 139, in an IP communication terminal in implementing the third embodiment. After being started in block 901, decision block 902 determines if communication is being set up. If the answer is no, control is returned to decision block 209. If the answer is yes, decision block 903 determines if the communication requires special media. This determination would be performed by detecting that the user had activated a special purpose window such as a T.140 conversation chat window or a fax folder. If the answer is no, control is transferred to block 904 which performs normal processing before returning control back to decision block 902.

If the answer is yes in decision block 903, block 906 determines the special media requirements. Then, block 907 forms an invite message with the dialed telephone number and requesting the special media and transmits this invite message.

After execution of block 907, decision block 908 determines if the destination/endpoint is available. If the answer is no, block 912 supplies an indication to the user that communication can not be established, and block 913 performs normal processing before returning control back to decision block 902.

If the answer in decision block 908 is yes, block 909 sends an acknowledgement message back to the endpoint, and block 911 performs normal processing before transferring control to decision block 1001 of FIG. 10.

Decision block 1001 determines if the user wishes to change the communication requirements which means a change in the media requirements. If the answer is no, decision block 1002 determines if the communication has been ended. If the answer is yes, control is transferred back to decision block 902 of FIG. 9. If the answer is no, communication is transferred back to decision block 1001.

If the answer is yes in decision block 1001, decision block 1003 determines if the new communication requirements require special media. This determination would be performed by detecting that the user had activated a special purpose window such as a T.140 conversation chat window or a fax folder. If the answer is no, block 1004 performs normal processing before transferring control back to decision block 1001. If the answer is yes, block 1006 determines the required media. Block 1007 then forms a re-invite message requesting the special media and transmits the re-invite message.

After execution of block 1007, decision block 1008 determines if the endpoint has accepted the request for special media. If the answer is yes, block 1009 sends an acknowledgement message, and block 1011 performs normal processing before transferring control back to decision block 1001. If the answer in decision block 1008 is no, block 1012 indicates to the user that communication can not be established, and block 1013 performs normal processing before transferring control back to decision block 1001.

Figure 11:
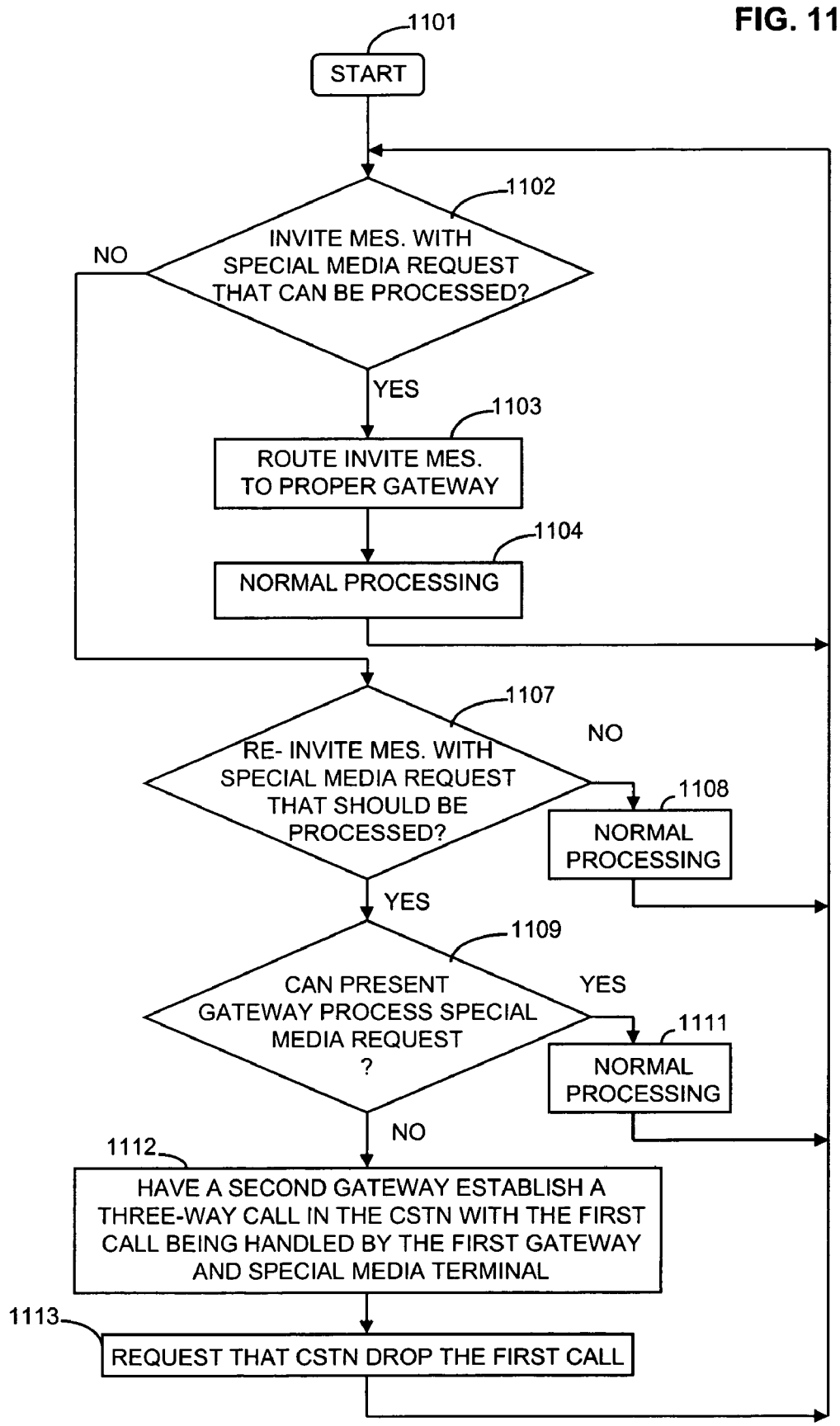
FIG. 11 illustrates, in flowchart form, operations in a third embodiment performed by a proxy.

FIG. 11 illustrates, in flowchart form, operations performed by a proxy in implementing the third embodiment. After being started in block 1101, decision block 1102 determines if an invite message with a special media request has been received that can be processed by the proxy. This means whether or not the request can be handled by a gateway controlled by the proxy. If the answer is no, control is transferred to decision block 1107.

If the answer in decision block 1102 is yes, block 1103 routes the invite message to the proper gateway, and block 1104 performs normal processing. After execution of block 1104, control is returned back to decision block 1102.

If the answer is no in decision block 1102, decision block 1107 determines if a re-invite message has been received with a special media request that should be processed by the proxy since it involves a session controlled by the proxy. If the answer is no, block 1108 performs normal processing before transferring control back to decision block 1102. If the answer in decision block 1107 is yes, decision block 1109 determines if the present gateway can process the special media request. If the answer is yes, block 1111 performs normal processing before transferring control back to decision block 1102.

If the answer in decision block 1109 is no, block 1112 has a second gateway that has the special media capabilities establish a 3-way call in the circuit switched telephone network with the first call being handled by the first gateway. After the establishment of this 3-way call, block 1113 requests that the circuit switched telephone network drop the first call before returning control back to decision block 1102.

FIG. 12 illustrates wireless switching system 1201 interconnected to circuit switched telephone network (CSTN) 1220 via gateways 1207-1209 that are capable of implementing the operations of the first embodiment. Circuit switched telephone network 121 is providing service for devices 1218-1219. Wireless switching system 1201 is providing service for wireless terminals 1202-1203. Wireless terminals 1202-1203 may be wireless telephones, wireless personal digital assistants (PDA), and personal computers using wireless telephony service. One skilled in the art could readily see that there could be a multitude of terminals being interconnected by wireless switching system 1201. One skilled in the art could also readily see that there could be a multitude of other devices being interconnected by wireless switching system 1201. Such devices may be, but are not limited to, computers, voice messaging systems, and instant messaging systems. Similarly, circuit switched telephone network 1220 could also be interconnecting a variety of telephone types and terminal types and systems.

Wireless switching system 1201 comprises controller 1204 that provides overall control of wireless switching system 1201 including the routing of calls to and from wireless terminals 1202-1203. Controller 1204 is well known to those skilled in the art. Radio interfaces 1211 provide interconnection to wireless terminals 1202-1203 under control of controller 1204. Switching network provides communication paths between wireless terminals and gateways.

Figure 14:
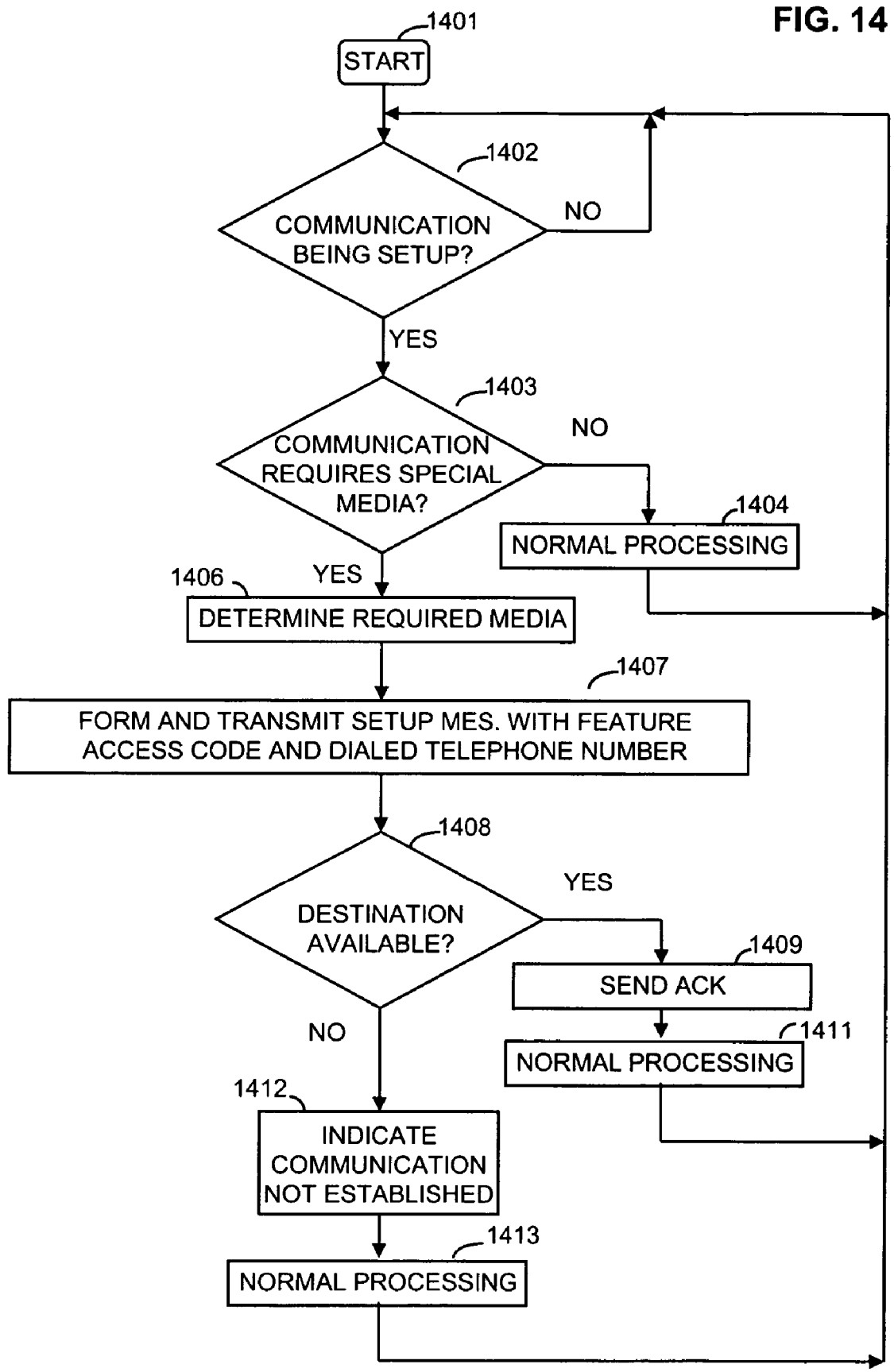
FIG. 14 illustrates, in flowchart form, operations performed by a first embodiment in a communication terminal of FIG. 12 or 13.

Consider the operations of implementing the first embodiment by the system illustrated by FIG. 12 with respect to the operations illustrated in FIG. 14. FIG. 14 illustrates, in flowchart form, operations performed by a wireless terminal, such as wireless terminal 1202, in implementing the first embodiment with respect to FIG. 12. After being started in block 1401, decision block 1402 determines if communication is being set up. If the answer is no, control is returned back to decision block 1402. If the answer is yes, decision block 1403 determines if the communication requires a special media. In the case of a wireless telephone, this special media maybe a Short Message Signal (SMS) message being directed to terminal known to require special media such as terminals 1218-1219 as detected by the wireless telephone. If the answer is no in decision block 1403, block 1404 performs normal processing before returning control back to decision block 1402.

If the answer is yes in decision block 1403, block 1406 determines the requirements for the special media. Block 1407 forms a setup message with a feature access code defining the special media and the dialed telephone number that defines the destination. Block 1407 then transmits the setup message to wireless switching system 1201.

After execution of block 1407, decision block 1408 determines if the destination, as defined by the dialed telephone number, is available. This is accomplished by the normal control messages being received back from the endpoint via the gateways and wireless switching system 1201. If the answer is yes, block 1409 transmits an acknowledge message to the endpoint, and block 1411 performs normal processing before returning control back to decision block 1402. If the answer is no in decision block 1408, block 1412 indicates to the user that the communication could not be established, and block 1413 performs normal processing before returning control back to decision block 1402.

Figure 15:
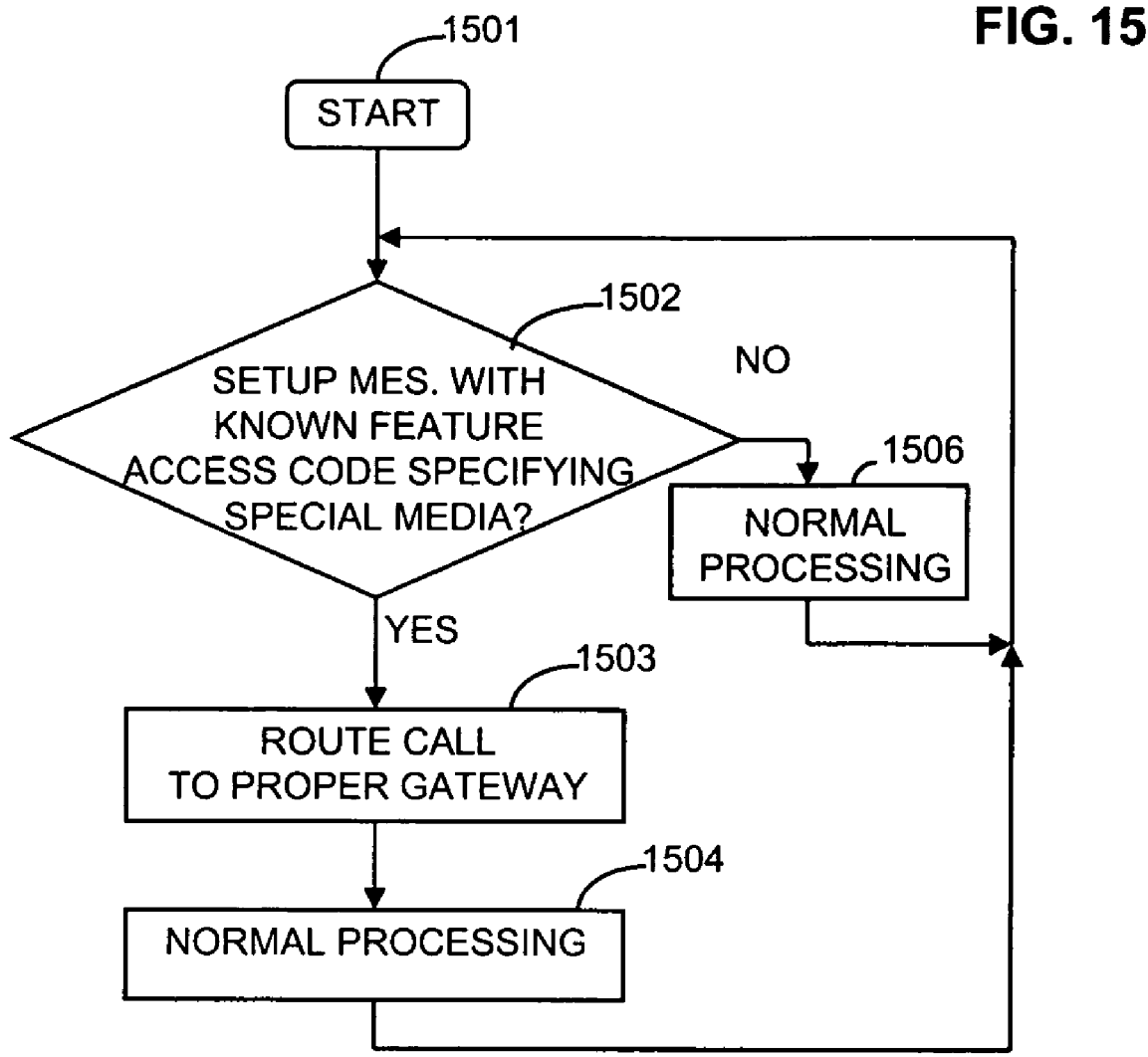
FIG. 15 illustrates, in flowchart form, operations performed by a first embodiment in a routing controller of FIG. 12 or 13.

FIG. 15 illustrates, in flowchart form, operations performed by a controller such as controller 1204, in implementing the first embodiment with respect to FIG. 12. After being started in block 1501, decision block 1502 determines if a setup message with a feature code requiring special media has been received. If the answer is no, block 1506 performs normal processing before returning control back to decision block 1502. If the answer is yes, block 1503 routes the setup message or its equivalent to the proper gateway that can supply the special media needed, and block 1504 performs normal processing before returning control to decision block 1502.

FIG. 13 illustrates packet switching system 1301 interconnected to switched telephone network (CSTN) 1320 via gateways 1307-1309 that are capable of implementing the operations of the first embodiment. Packet switching system 1301 may any of a variety of switching systems for communicating packets as are well known to those skilled in the art. switched telephone network 131 is providing service for devices 1318-1319. Packet switching system 1301 is providing service for IP terminals 1302-1303. IP terminals 1302-1303 may be similar in structure to IP communication terminal 131 of FIG. 1. One skilled in the art could readily see that there could be a multitude of terminals being interconnected by packet switching system 1301. One skilled in the art could also readily see that there could be a multitude of other devices being interconnected by packet switching system 1301. Such devices may be, but are not limited to, computers, voice messaging systems, and instant messaging systems. Similarly, circuit switched telephone network 1320 could also be interconnecting a variety of telephone types and terminal types and systems.

Packet switching system 1301 comprises controller 1304 that provides overall control of packet switching system 1301 including the routing of calls to and from IP terminals 1302-1303. Controller 1304 is well known to those skilled in the art. Interfaces 1311 provide interconnection to IP terminals 1302-1303 under control of controller 1304. Switching network provides communication paths between IP terminals and gateways. Controller 1304, interfaces 1311 and switching network 1306 could be one or more routers of a IP switching network.

Consider the operations of implementing the first embodiment by the system illustrated by FIG. 13 with respect to the operations illustrated in FIG. 14. FIG. 14 illustrates, in flowchart form, operations performed by a IP terminal, such as IP terminal 1302, in implementing the first embodiment with respect to FIG. 13. After being started in block 1401, decision block 1402 determines if communication is being set up. If the answer is no, control is returned back to decision block 1402. If the answer is yes, decision block 1403 determines if the communication requires a special media. This determination would be performed by detecting that the user had activated a special purpose window such as a T.140 conversation chat window or a fax folder. If the answer is no in decision block 1403, block 1404 performs normal processing before returning control back to decision block 1402.

If the answer is yes in decision block 1403, block 1406 determines the requirements for the special media. Block 1407 forms a setup message with a feature access code defining the special media and the dialed telephone number that defines the destination. Block 1407 then transmits the setup message to packet switching system 1301.

After execution of block 1407, decision block 1408 determines if the destination, as defined by the dialed telephone number, is available. This is accomplished by the normal control messages being received back from the endpoint via the gateways and packet switching system 1301. If the answer is yes, block 1409 transmits an acknowledge message to the endpoint, and block 1411 performs normal processing before returning control back to decision block 1402. If the answer is no in decision block 1408, block 1412 indicates to the user that the communication could not be established, and block 1413 performs normal processing before returning control back to decision block 1402.

FIG. 15 illustrates, in flowchart form, operations performed by a controller such as controller 1304, in implementing the first embodiment with respect to FIG. 13. After being started in block 1501, decision block 1502 determines if a setup message with a feature code requiring special media has been received. If the answer is no, block 1506 performs normal processing before returning control back to decision block 1502. If the answer is yes, block 1503 routes the setup message or its equivalent to the proper gateway that can supply the special media needed, and block 1504 performs normal processing before returning control to decision block 1502.

When the operations of an IP terminal, controller or proxy are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP terminal, controller or proxy can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, apparatus or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where IP terminal, controller or proxy is implemented in hardware, IP terminal, controller or proxy can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed:

1. A method of routing telecommunication calls in a communication system based on media type where the communication system has an IP network and a circuit switched network and the IP network has a plurality of gateways interconnecting the IP network to the circuit switched network with each of the plurality of gateways controlled by a one of a plurality of session initiation protocol proxies, comprising:
   initiating a telecommunication call by a first telecommunication terminal from the first telecommunication terminal connected to the IP network to a second telecommunication terminal connected to the circuit switched network;
   detecting a requirement for a special media type for the telecommunication call by the first telecommunication terminal;
   transmitting a message to the plurality of session initiation protocol proxies which are components of the IP network to set up the call and defining the requirement for a special media type in the message by the first telecommunication terminal wherein each of the plurality of session initiation protocol proxies is responsive to the message to determine if a one of the plurality of gateways connected to the second telecommunication terminal and controlled by a one of the plurality of session initiation protocol proxies can provide the special media type; and
   establishing the telecommunication call by the one of the plurality of session initiation protocol proxies controlling the one of the plurality of gateways upon the one of the plurality of session initiation protocol proxies determining in response to the message that the controlled one of the plurality of gateways can provide the special media type and interconnects the second telecommunication terminal to the IP network via the circuit switched network.

2. The method of claim 1 wherein the detecting comprises determining an opening of a designated window on the first telecommunication terminal.

3. The method of claim 1 wherein the transmitting comprises inserting a predefined access code into the message for the telecommunication call; and
   recognizing the predefined access code by the one of the plurality of session initiation protocol proxies controlling the one of the plurality of gateways.

4. The method of claim 1 wherein the message is a session initiation protocol invite message with a predefined header designating the special media type;
   the establishing comprises recognizing the predefined header by the one of the plurality of session initiation protocol proxies controlling the one of the plurality of gateways; and
   routing the session initiation protocol invite message to the one of the plurality of gateways by the one of the plurality of session initiation protocol proxies.

5. The method of claim 1 wherein the transmitting comprises specifying the requirement for the special media type in the message which is a session initiation protocol invite message;
   the establishing comprises recognizing the specified requirement in the session initiation protocol invite message by the one of the plurality of session initiation protocol proxies controlling the one of the plurality of gateways; and routing the session initiation protocol invite message to the one of the plurality of gateways by the one of the plurality of session initiation protocol proxies.

6. The method of claim 1 wherein the special media type is for communication using at least one of TTY protocols or facsimile protocols.

7. The method of claim 6 wherein the one of the plurality of gateways is capable of communication using a plurality of TTY protocols.

8. An apparatus for implementing the method of claim 1.
9. An apparatus for implementing the method of claim 2.
10. An apparatus for implementing the method of claim 3.
11. An apparatus for implementing the method of claim 4.
12. An apparatus for implementing the method of claim 5.

13. A method of routing telecommunication calls in a communication system based on media type where the communication system having an IP network and a circuit switched network, comprising:

routing a telecommunication call from a first telecommunication terminal connected to the IP network to a second telecommunication terminal connected to the circuit switched network via a first gateway interconnecting the IP network and circuit switched network;

detecting a requirement for a special media type for the telecommunication call by the first telecommunication terminal;

transmitting a message via a call path for the telecommunication call by the first telecommunication terminal requesting that the media type of the telecommunication call be changed to the special media type; and transferring the telecommunication call to a second gateway wherein the second gateway is capable of providing the special media type by a initiation protocol proxy that is a component of the IP network controlling the first gateway in response to the message upon the first gateway being incapable of providing the special media type and interconnects the second telecommunication terminal to the IP network via the circuit switched network.

14. The method of claim 13 wherein the detecting comprises determining the opening of a designated window on the first telecommunication terminal that is used for the special media type.

15. The method of claim 13 wherein the message is a session initiation protocol re-invite message.

16. The method of claim 13 wherein the detecting is responsive to information received from the second telecommunication terminal.

17. The method of claim 13 wherein the special media type is for communication using at least one of TTY protocols or facsimile protocols.

18. A method of communicating telecommunication calls between a IP terminal and a TTY terminal via a communication system having an IP network and a circuit switched network where the IP terminal is connected to the IP network and TTY terminal is connected to the circuit switched network and the IP network has a plurality of gateways interconnecting the IP network to the circuit switched network with each of the plurality of gateways controlled by a one of a plurality of session initiation protocol proxies, comprising:

detecting an initiation of a telecommunication call for communication with the TTY terminal by the IP terminal;

transmitting a message to setup the telecommunication call using the TTY protocol with circuit switched network to the plurality of session initiation protocol proxies which are components of the IP network to set up the call and defining a requirement for the TTY protocol in the message wherein each of the plurality of session initiation protocol proxies is responsive to the message to determine if a one of the plurality of gateways connected to the TTY terminal and controlled by a one of the plurality of session initiation protocol proxies can provide the TTY protocol; and establishing the telecommunication call by the one of the plurality of session initiation protocol proxies controlling the one of the plurality of gateways upon the one of the plurality of session initiation protocol proxies determining in response to the message that the controlled one of the plurality of gateways can provide the TTY protocol and interconnects the TTY terminal to the IP network via the circuit switched network.

19. The method of claim 18 wherein the detecting comprises determining an opening of a designated window on the IP terminal used for TTY communication.

20. The method of claim 18 wherein the transmitting comprises inserting a predefined access code into the message; and the establishing comprises recognizing the predefined access code by the one of the plurality of gateways.

21. The method of claim 18 wherein the message is a session initiation protocol invite message with a predefined header designating the TTY protocol;

the establishing comprises recognizing the predefined header by the one of the plurality of session initiation protocol proxies controlling the one of the subset of the plurality of gateways; and routing the session initiation protocol invite message to the one of the plurality of gateways by the one of the plurality of session initiation protocol proxies.

22. The method of claim 18 wherein the message is a session initiation protocol invite;

the transmitting comprises specifying the requirement for the TTY protocol in the session initiation protocol invite message;

the establishing comprises recognizing the specified requirement by the one of the plurality of session initiation protocol proxies controlling the one of the plurality of gateways; and routing the session initiation protocol invite message to the one of the plurality of gateways by the one of the plurality of session initiation protocol proxies.

23. A computer-readable medium storing computer executable instructions implementing a method for routing telecommunication calls in a telecommunication switching system based on media type where the communication system has an IP network and a circuit switched network and the IP network has a plurality of gateways interconnecting the IP network to the circuit switched network with each of the plurality of gateways controlled by a one of a plurality of session initiation protocol proxies, the method comprising:

detecting a requirement for a special media type for a telecommunication call being setup from a first telecommunication terminal connected to the IP network to a second telecommunication terminal connected to the circuit switched network;

transmitting a message to the plurality of session initiation protocol proxies which are components of the IP network to set up the call and defining the requirement for a special media type in the message wherein each of the plurality of session initiation protocol proxies is responsive to the message to determine if a one of the plurality of gateways connected to the second telecommunication terminal and controlled by a one of the plurality of session initiation protocol proxies can provide the special media type; and establishing the telecommunication call by the one of the plurality of session initiation protocol proxies controlling the one of the plurality of gateways upon the one of the plurality of session initiation protocol proxies determining in response to the message that the controlled one of the plurality of gateways can provide the special media type and interconnects the second telecommunication terminal to the IP network via the circuit switched network.

24. The computer-readable medium of claim 23 wherein the computer-executable instructions for detecting comprise computer-executable instructions for determining an opening of a designated window on the first telecommunication terminal.

25. The computer-readable medium of claim 23 wherein the computer-executable instructions for transmitting comprise computer-executable instructions for inserting a predefined access code into the message for the telecommunication call; and the computer-executable instructions for establishing comprise computer-executable instructions for recognizing the predefined access code by the one of the plurality of session initiation protocol proxies controlling the one of the plurality of gateways.

26. The computer-readable medium of claim 23 wherein the message is a session initiation protocol invite message with a predefined header designating the special media type;

the computer-executable instructions for establishing comprise computer executable instructions for recognizing the predefined header by the one of the plurality of session initiation protocol proxies controlling the one of the plurality of gateways; and computer executable instructions for routing the session initiation protocol invite message to the one of the plurality of gateways by the one of the plurality of session initiation protocol proxies.

27. The computer-readable medium of claim 23 wherein the computer-executable instructions for the transmitting comprise computer-executable instructions specifying the requirement for the special media type in the message which is a session initiation protocol invite message;

the computer-executable instructions for establishing comprise computer-executable instructions for recognizing the specified requirement in the session initiation protocol invite message by the one of the plurality of session initiation protocol proxies controlling the one of the plurality of gateways; and computer-executable instructions routing the session initiation protocol invite message to the one of the plurality of gateways by the one of the plurality of session initiation protocol proxies.

28. The computer-readable medium of claim 23 wherein the special media type is for communication using at least one of TTY protocols or facsimile protocols.

29. The computer-readable medium of claim 28 wherein the one of the plurality of gateways is capable of communication using a plurality of TTY protocols.

30. A computer-readable medium storing computer executable instructions implementing a method for routing telecommunication calls in a communication system based on media type where the communication system having an IP network and a circuit switched network, the method comprising:

routing a telecommunication call from a first telecommunication terminal connected to the IP network to a second telecommunication terminal connected to the circuit switched network via a first gateway interconnecting the IP network and circuit switched network;

detecting a requirement for a special media type for the telecommunication call by the first telecommunication terminal;

transmitting a message via a call path for the telecommunication call by the first telecommunication terminal requesting that the media type of the telecommunication call be changed to the special media type; and transferring the telecommunication call to a second gateway wherein the second gateway is capable of providing the special media type by a initiation protocol proxy that is a component of the IP network controlling the first gateway in response to the message upon the first gateway being incapable of providing the special media type and interconnects the second telecommunication terminal to the IP network via the circuit switched network.

31. The computer-readable medium of claim 30 wherein the computer-executable instructions for detecting comprise computer-executable instructions for determining an opening of a designated window on the first telecommunication terminal that is used for the special media type.

32. The computer-readable medium of claim 30 wherein the message is a session initiation protocol re-invite message.

33. The computer-readable medium of claim 30 wherein the computer-executable instructions for detecting is responsive to information received from the second telecommunication terminal.

34. The computer-readable medium of claim 30 wherein the special media type is for communication using at least one of TTY protocols or facsimile protocols.

* * * * *